(12) United States Patent
Castinado et al.

(10) Patent No.: US 11,184,365 B1
(45) Date of Patent: Nov. 23, 2021

(54) SYSTEM FOR DATA AUTHENTICATION OPTIMIZATION BASED ON REAL TIME AND HISTORICAL RESOURCE INFORMATION

(71) Applicant: BANK OF AMERICA CORPORATION, Charlotte, NC (US)

(72) Inventors: Joseph Benjamin Castinado, North Glenn, CO (US); Lee Barry Frantz, Souderton, PA (US); Lee Ann Proud, Ponte Vedra, FL (US); Ann Ta, Scottsdale, AZ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 28 days.

(21) Appl. No.: 16/905,398

(22) Filed: Jun. 18, 2020

(51) Int. Cl.
*H04L 29/06* (2006.01)

(52) U.S. Cl.
CPC .................. *H04L 63/107* (2013.01)

(58) Field of Classification Search
CPC .................................................... H04L 63/107
See application file for complete search history.

(56) References Cited

U.S. PATENT DOCUMENTS

| | | | | |
|---|---|---|---|---|
| 7,707,089 | B1* | 4/2010 | Barton | G06Q 20/105 705/35 |
| 8,745,698 | B1* | 6/2014 | Ashfield | G06Q 40/02 726/4 |
| 9,179,257 | B2 | 11/2015 | Hong et al. | |
| 9,262,759 | B2* | 2/2016 | Hanson | G06Q 20/405 |
| 9,311,685 | B2 | 4/2016 | Harkey et al. | |
| 9,319,834 | B2 | 4/2016 | Pierce, II et al. | |
| 9,355,231 | B2* | 5/2016 | Disraeli | H04W 4/02 |
| 9,398,404 | B2 | 7/2016 | Pierce, II et al. | |
| 9,549,287 | B2 | 1/2017 | Baran et al. | |
| 9,560,482 | B1 | 1/2017 | Frenz | |
| 9,576,282 | B2* | 2/2017 | Murphy | G06Q 30/06 |
| 9,767,474 | B1 | 9/2017 | Ramalingam et al. | |
| 9,781,557 | B1 | 10/2017 | Rackley et al. | |
| 9,860,697 | B2 | 1/2018 | Frenz | |
| 9,942,707 | B2 | 4/2018 | Austraat et al. | |
| 9,949,074 | B2 | 4/2018 | Austraat et al. | |

(Continued)

*Primary Examiner* — Richard A McCoy
(74) *Attorney, Agent, or Firm* — Michael A. Springs; Moore & Van Allen PLLC; W. Kevin Ransom

(57) ABSTRACT

Embodiments of the invention are directed to systems, methods and computer program products for selective authorization of resource usage based on geographic positioning and usage category information associated with a resource interaction system. The invention receives historic positional information and category of usage information related to a resource interaction system, where the historic positional and category of usage information defines a base positional location and category of usage for the resource interaction system. The system also receives current positional information associated with the resource interaction system and accesses authorized usage parameters associated with the current positional information associated with the resource interaction system. Based on this information, the invention controls usage of the resource interaction system based on authorized usage parameters associated with the current positional information and based on the category of usage information.

20 Claims, 4 Drawing Sheets

(56) References Cited

U.S. PATENT DOCUMENTS

| | | | |
|---|---|---|---|
| 10,049,349 B1* | 8/2018 | Grassadonia | G06Q 20/40 |
| 10,193,894 B2 | 1/2019 | Meredith et al. | |
| 10,306,403 B2 | 5/2019 | Meganathan | |
| 10,402,812 B2 | 9/2019 | Hudson et al. | |
| 10,488,062 B2 | 11/2019 | Quam et al. | |
| 10,503,377 B2 | 12/2019 | Whalin et al. | |
| 10,567,906 B1 | 2/2020 | Iqbal et al. | |
| 10,580,027 B1* | 3/2020 | Rephlo | G06Q 30/08 |
| 2007/0055439 A1* | 3/2007 | Denker | G06Q 10/02 |
| | | | 701/532 |
| 2010/0218249 A1* | 8/2010 | Wilson | H04L 9/3226 |
| | | | 726/19 |
| 2014/0149282 A1 | 5/2014 | Philliou et al. | |
| 2014/0342662 A1 | 11/2014 | Das et al. | |
| 2015/0089585 A1* | 3/2015 | Novack | H04L 63/1433 |
| | | | 726/3 |
| 2015/0163629 A1 | 6/2015 | Cheung | |
| 2017/0124671 A1* | 5/2017 | Tam | G06Q 20/047 |
| 2018/0189769 A1* | 7/2018 | Narasimhan | G06Q 20/3278 |
| 2021/0233106 A1* | 7/2021 | Mossoba | H04L 67/26 |

* cited by examiner

SYSTEM FOR DATA AUTHENTICATION OPTIMIZATION BASED ON REAL TIME AND HISTORICAL RESOURCE INFORMATION

FIELD OF THE INVENTION

The present invention relates to systems, computer implemented methods, and computer program products for selective authorization of resource usage via a network based on geographic positioning and usage category information associated with a resource interaction system and a remote requesting system.

BACKGROUND OF THE INVENTION

Data security and remote interaction with a network system is a continuous concern relative to possible misuse of the network system or performance of operations associated with such network system that can cause risk of data or other resource loss. Many current security systems, however, offer a prophylactic approach that is not tailored to the specifics of a given network device. This, in turn, has the potential to create disruption in the operations of the network device relative to remote requesting systems. In some instances, due to the generalized nature of the security, interactions between the network device and a remote requesting system are blocked unnecessarily, when such transactions should be allowed. Similarly, in other instances, interactions may be allowed, when, based on the specifics of the network device and/or the remote requesting system, such interactions should be blocked for security purposes. Optimization of a security schema should be tailored to the specifics of the network system and to the types or categories of interactions that are allowed for the network device to thereby better optimize operation of the network device.

Concerns also exist associated with transfer of resources to a specific geographic location or jurisdiction, based on the rules and regulations regarding transfer and usage differ from place to place. In other words, not all transactions are the same, but may require tailoring based on the geographic location or jurisdiction in which the resource is being transferred to and used.

BRIEF SUMMARY OF THE INVENTION

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In general, embodiments of the invention are directed to systems, methods and computer program products for selective authorization of resource usage based on geographic positioning and usage category information associated with a resource interaction system. The system, via a computing processor, receives historic positional information and category of usage information related to a resource interaction system, where the historic positional and category of usage information defines a base positional location and category of usage for the resource interaction system. The system also receives current positional information associated with the resource interaction system and accesses authorized usage parameters associated with the current positional information associated with the resource interaction system. Based on this information, the system controls usage of the resource interaction system based on authorized usage parameters associated with the current positional information and based on the category of usage information.

In some embodiments, the historic positional information used by the system relates to one or more geographic locations where the stored data and/or historic interaction data indicate one or more geographic locations. In further or alternative embodiments, the category of usage information is also based on one or more of stored data and/or historic interaction data.

Where the geographic locations are based on historical interaction data, the system may review previous interactions of the resource interaction system and determine the one or more geographic locations where the resource interaction system traditionally operates. Based on this information, the system creates a geofence associated with the determined geographic location(s) to thereby create a usage parameters for the resource interaction system. In this embodiment, the resource interaction system would be allowed to interact with other remote devices when it is determined that the resource interaction system is located inside the geofence. The geofence could be fairly large, such as time zone associated with where the resource interaction system is located or it could be as narrow as a specific geographic position, whereby if the location resource interaction system is located outside the geofence, interactions of the resource interaction system may be limited or blocked In some embodiments, the resource interaction system may be a mobile device or may be used in more than one geographic area. In these instances, the system may either receive this geographic information from a storage device as indicating the geographic locations where the resource interaction system may be used (i.e., usage parameters). In other embodiments, the system may use the historical interaction data to assess the geographic location of various interactions of the resource interaction system. Whether prestored or determined via historical information, these added geographic locations may be geofenced, as added locations, in addition to the base location for the resource interaction system, where they system may control usage of the resource interaction system and allowed for interactions by the resource interaction system. In this context, the system may use machine learning models to assess the various geographic locations associated with the resource interaction system to create geofenced zones where the resource interaction system may operate. The system could be dynamic in that it not only uses transaction data between a resource interaction system and user devices, but also takes into account other information associated with the user of the resource interaction system that may indicate that the user is changing geographic locations, traveling, expanding its usage categories, and the like to inform the determination of the geographic base locations and usage categories of the resource interaction system.

In addition to geographic parameters for transactions, the resource interaction system may also be controlled based on the nature of the transactions to be performed by the resource interaction system. This form of usage parameter can be used to restrict transactions by the resource interaction system, if such transactions are outside the usage parameters. In some embodiments, all of the possible forms of interactions available are categorized by function of the interaction. It is determined what categories of usage the resource interaction system may perform. This category or categories of usage can either be stored in a storage system associated with the resource interaction system or they can be determined based on historical information. In this latter embodiment, the system evaluates the historical data to determine various interactions that the resource interaction system has performed and creates usage parameter listing these transactions into categories of usage that are allowed by the resource interaction system. For example, a set of interactions that are frequently performed by the resource interaction system are categorized as allowed interactions, while others would require either further diligence or blocked altogether. In some embodiment, in addition to denying the interaction, the system may also send an alert if the current proposed interaction has a corresponding interaction category that does not match category of usage information associated with the resource interaction system.

In addition to reviewing usage parameters, such as geographic location and category of interactions associated with the resource interaction system, the system may also review the various remote devices and the categories of transactions that such remote devices may be attempting to perform with the resource interaction device. For example, a remote requesting system may be requesting to perform an interaction with the resource interaction system. The system of the invention, may evaluate the geographic location of such requesting system. The system of the invention may determine whether the usage parameters indicate that the resource integration system is authorized to transact with a remote device located at the remote geographic location. These remote geographic location usage parameters may be stored or again, the system may determine such remote geographic location usage parameters from analysis of historical data. The system will then either allow or deny the requested interaction based on the usage parameters.

In some embodiments, the control of operation may be based on the category of transaction. The system of the invention may evaluate the nature of the transaction being requested by the remote requesting system and compare this to usage parameters associated with categories of usage information. If the transaction is in a category of transactions that are permitted for interaction between the remote requesting system and the resource interaction system, then the system of the invention will allow the interaction. Otherwise, it may reject or deny the interaction.

In some embodiments, the controls used for allowing interactions by the resource interaction system may be based on a combination of both geographic location and categories of usage information, such that only certain interactions are allowed at only certain geographic locations, while a different set of interactions may be allowed at a different location. Here again, these various combination of usage information could be stored or they could be determined based on analysis of historical data.

This embodiment may also be used to control interactions between the resource interaction system and a remote requesting system. For example, the system of the present invention may control interactions between the remote requesting system and the resource interaction system based on geographic information, category of usage information, or a combination of both.

The following paragraphs provide a specific summary of the claims. For example, in one embodiment, a system is provided for selective authorization of resource usage based on geographic positioning and usage category information associated with a resource interaction system. The system comprise a computing platform comprising a memory device storing a plurality of computer instructions, and at least one electronic processor in communication with the memory, wherein the at least one electronic processor is configured to execute the computer instructions to:

receive, via an electronic network, historic positional information and category of usage information related to at least one resource interaction system, where said historic positional and category of usage information defines a base positional location and category of usage for the at least one resource interaction system;

receive, via an electronic network, current positional information associated with the at least one resource interaction system;

access, via an electronic network, authorized usage parameters associated with the current positional information associated with the at least one resource interaction system; and control usage of the resource interaction system based on authorized usage parameters associated with the current positional information and based on the category of usage information.

In one embodiment, the historic positional information relates to one or more geographic locations where at least one of stored data and/or historic interaction data indicate the one or more geographic locations. In one embodiment, the historic positional information relates to one or more geographic locations, wherein at least one electronic processor is configured to execute the computer instructions to determine the one or more geographic locations based on at least one of stored data and/or historic interaction data indicating the historic positional information.

In one embodiment, the category of usage information is based on one or more of stored data and/or historic interaction data. In one embodiment, the at least one electronic processor is configured to execute the computer instructions to determine the category of usage information based on one or more of stored data and/or historic interaction data. In one alternative or additional embodiment the category of usage data defines types of interactions that are allowed to occur using the resource interaction system, where the at least one electronic processor is configured to execute the computer instructions to control usage of the resource interaction system based on determining whether a current proposed interaction has a corresponding interaction category that matches category of usage information associated with the resource interaction system. The at least one electronic processor is configured to execute the computer instructions to at least one of deny and/or send an alert if the current proposed interaction has a corresponding interaction category that does not match category of usage information associated with the resource interaction system.

In one embodiment, the historic positional information relates to one or more geographic locations where the resource interaction system has been designated for authorized use, where the at least one electronic processor is configured to execute the computer instructions to control usage of the resource interaction system based on determining whether a current proposed interaction is at a geographic location corresponding to the one or more geographic locations associated with the historic positional information. The at least one electronic processor is configured to execute the computer instructions to at least one of deny and/or send an alert if the current proposed interaction is at a geographic location that does not correspond to the one or more geographic locations associated with the historic positional information.

In some embodiments, the historical position information is based on analysis of previous interactions associated with the resource interaction system, where such interactions indicate geographic locations where the resource interaction system has been used in the past. In at least one embodiment, the historical position information is based on analysis of previous interactions associated with the resource interaction system, where such interactions indicate geographic locations from which the resource interaction system has received requests for interactions.

In some embodiments, a remote request system may request to interact with the resource interaction system. In this embodiment, the at least one electronic processor is configured to execute the computer instructions to:

receive a request from a requesting system to perform an interaction with the resource interaction system;

determine a geographic location associated with the requesting system;

compare the geographic location associated with the requesting system with the historical position information associated with the resource interaction system; and control usage of the resource interaction system with the requesting system based on authorized usage parameters associated with the geographic location associated with the requesting system and the current positional information of the resource interaction system.

In one embodiment, the authorized usage parameters define geographic locations where the resource interaction system can receive and fulfill requests from, and wherein the at least one electronic processor is configured to execute the computer instructions to control usage of the resource interaction system, such that if the geographic location associated with the requesting system is not a geographic location allowed in the authorized usage parameters, an interaction between the requesting system and the resource interaction system is denied.

In one embodiment, the authorized usage parameters define geographic locations where the resource interaction system can be located in order to receive and fulfill requests, and wherein the at least one electronic processor is configured to execute the computer instructions to control usage of the resource interaction system, such that if the current geographic location associated with the resource interaction system is not a geographic location allowed in the authorized usage parameters, an interaction between the requesting system and the resource interaction system is denied.

In some embodiments, the at least one electronic processor is configured to execute the computer instructions to update the authorized usage parameters based on a set of recent interactions with the resource interaction system.

In some embodiments, the resource interaction system is a point of transaction device.

In some embodiments, the system may be used to create parameters to be used in an interaction with a remote requesting device. In one embodiment, a system for dynamic resource interaction allocation based on geographic positioning and usage category information associated with a resource interaction system is provided. The system comprises a computing platform comprising a memory device storing a plurality of computer instructions, and at least one electronic processor in communication with the memory. The at least one electronic processor is configured to execute the computer instructions to:

receive, via an electronic network, historic positional information and category of usage information related to at least one resource interaction system, where said historic positional and category of usage information defines a base positional location and category of usage for the at least one resource interaction system;

determine a set of parameters associated with the determined base positional location and category of usage, where such parameters are to be used for interactions having characteristics meeting the determined base positional location and category of usage information;

receive, via an electronic network, a proposed interaction from a requesting system containing geographic information and usage category information associated with the proposed interaction;

determine whether the geographic information and usage category information associated with the proposed interaction correspond to the base positional location and category of usage for the at least one resource interaction system; and if the geographic information and usage category information associated with the proposed interaction correspond to the base positional location and category of usage for the at least one resource interaction system, apply the set of parameter to the interaction to thereby process the interaction.

The features, functions, and advantages that have been discussed may be achieved independently in various embodiments of the present invention or may be combined with yet other embodiments, further details of which can be seen with reference to the following description and drawings.

In addition to the discussed system, any of the functions, operations, or steps described herein may also be performed via a computer implemented method or via computer program product being performed by one or more computer processors.

BRIEF DESCRIPTION OF THE DRAWINGS

Figure 1:
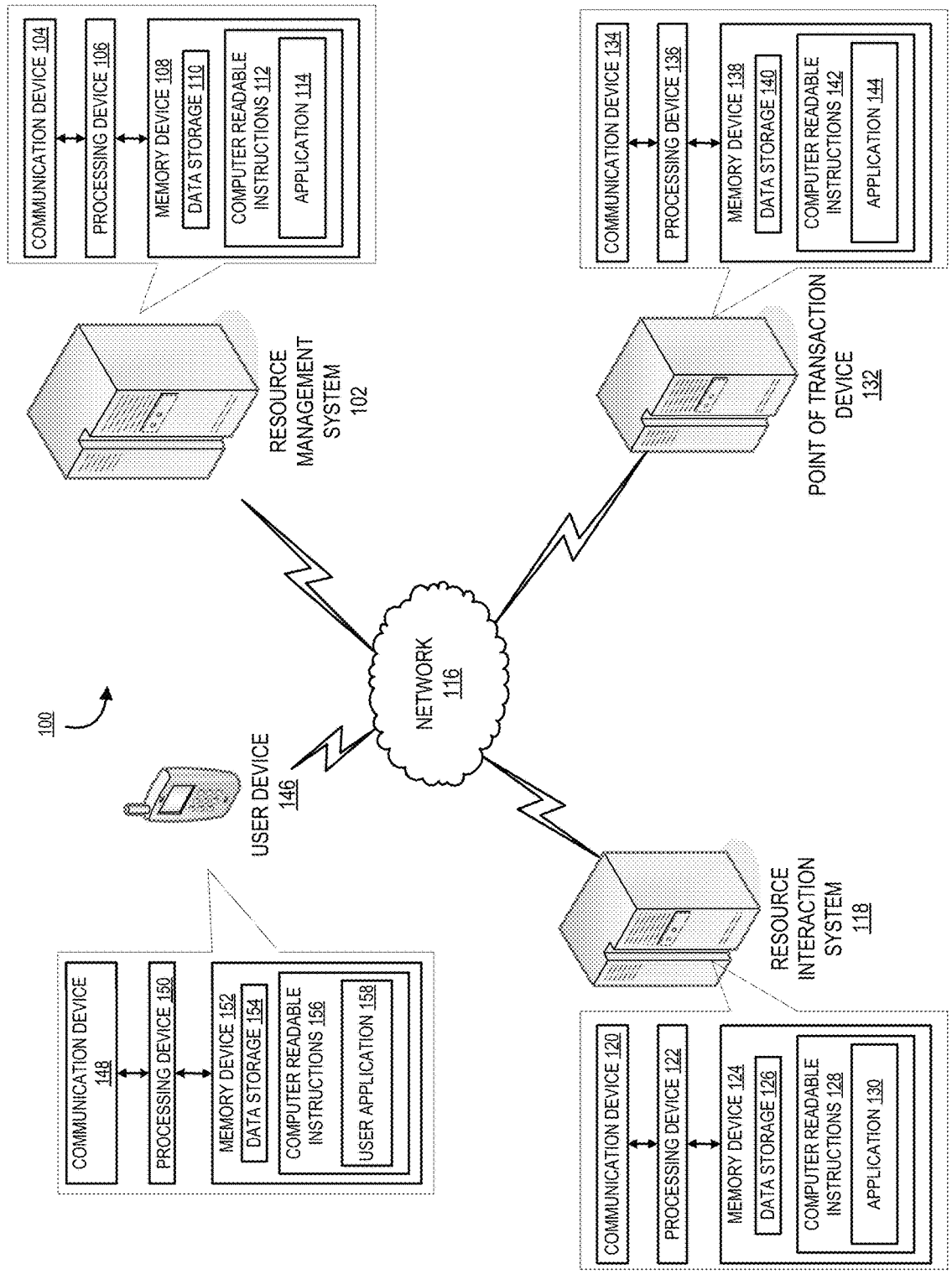
Figure 2:
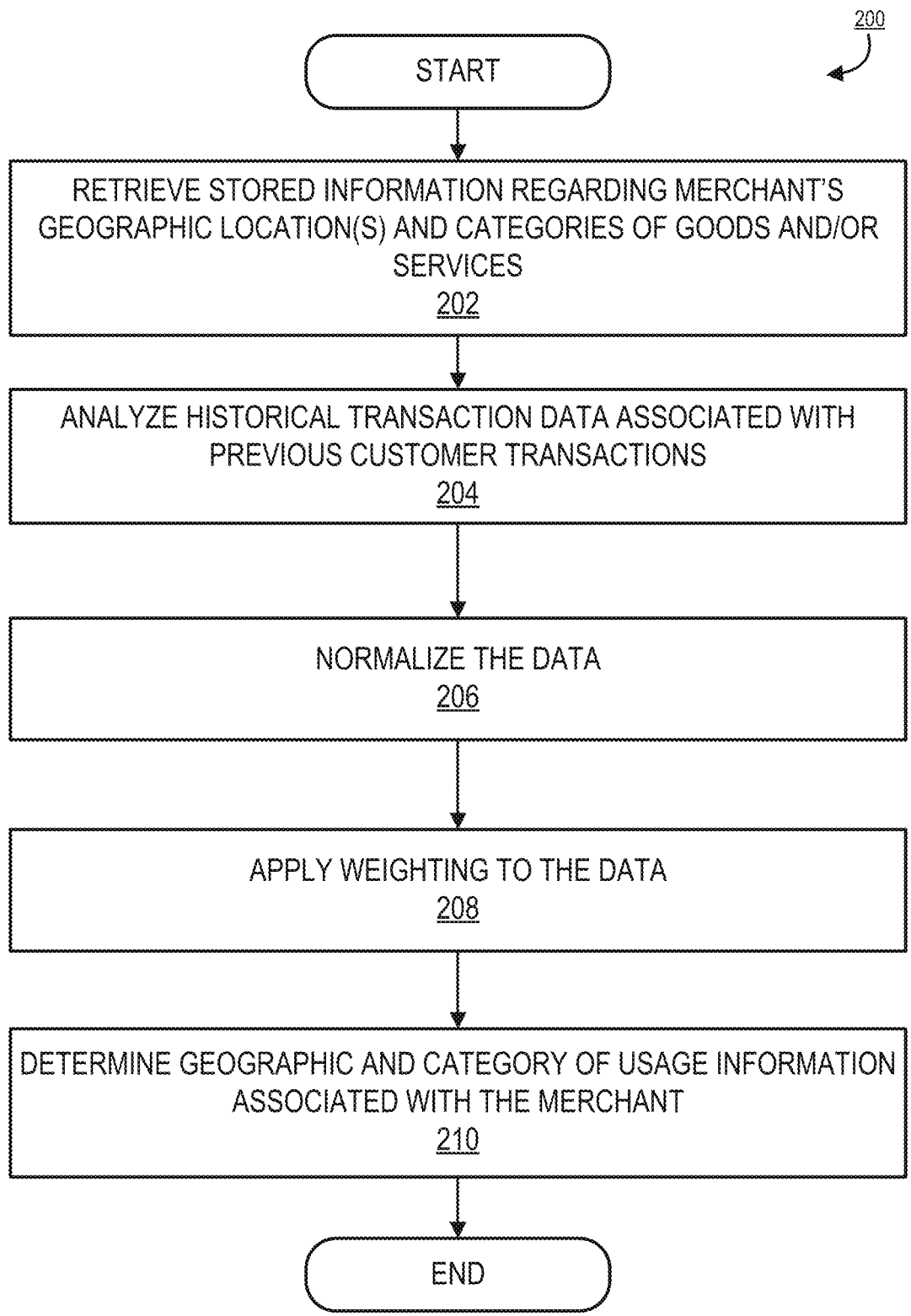
Figure 3:
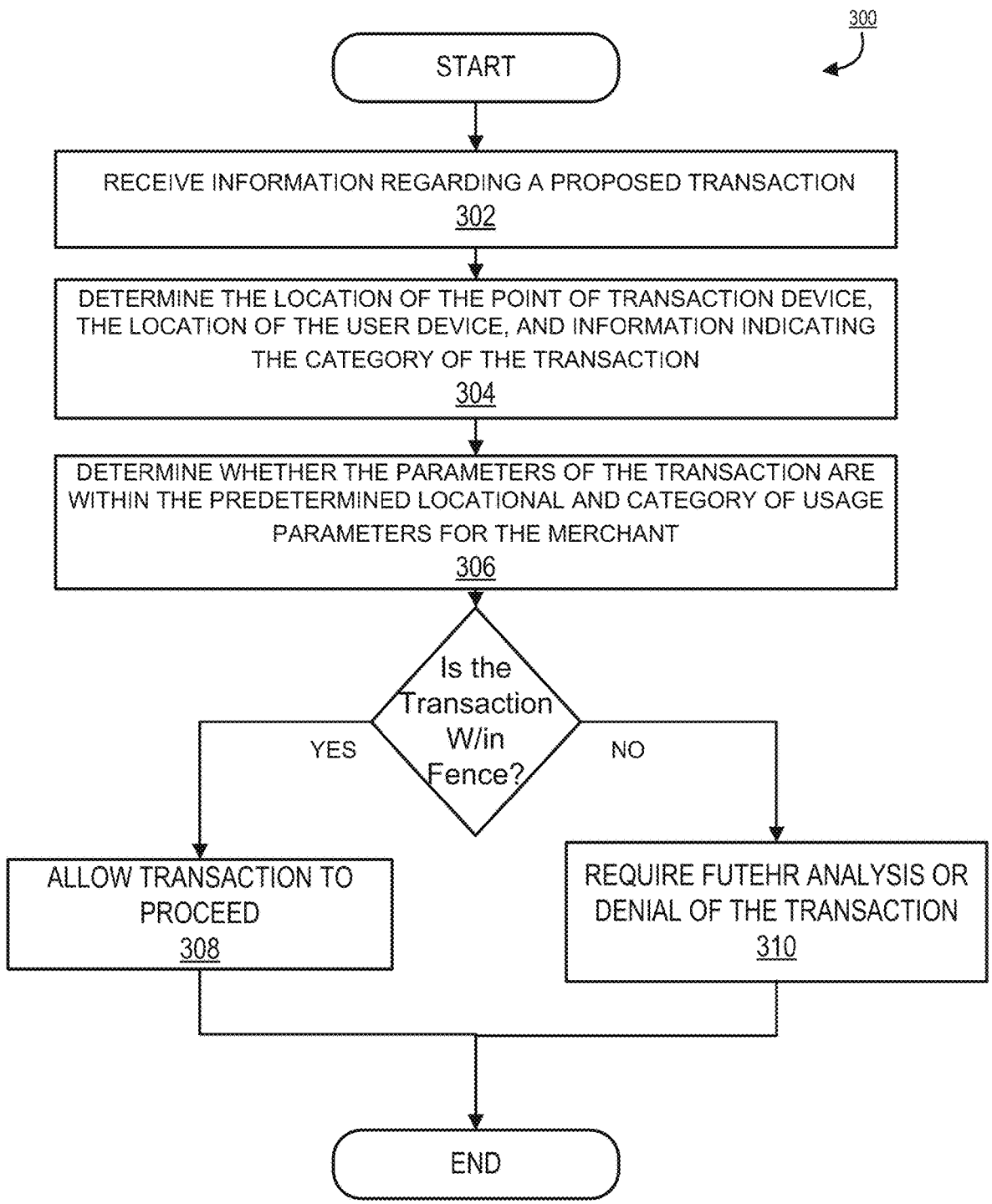
Figure 4:
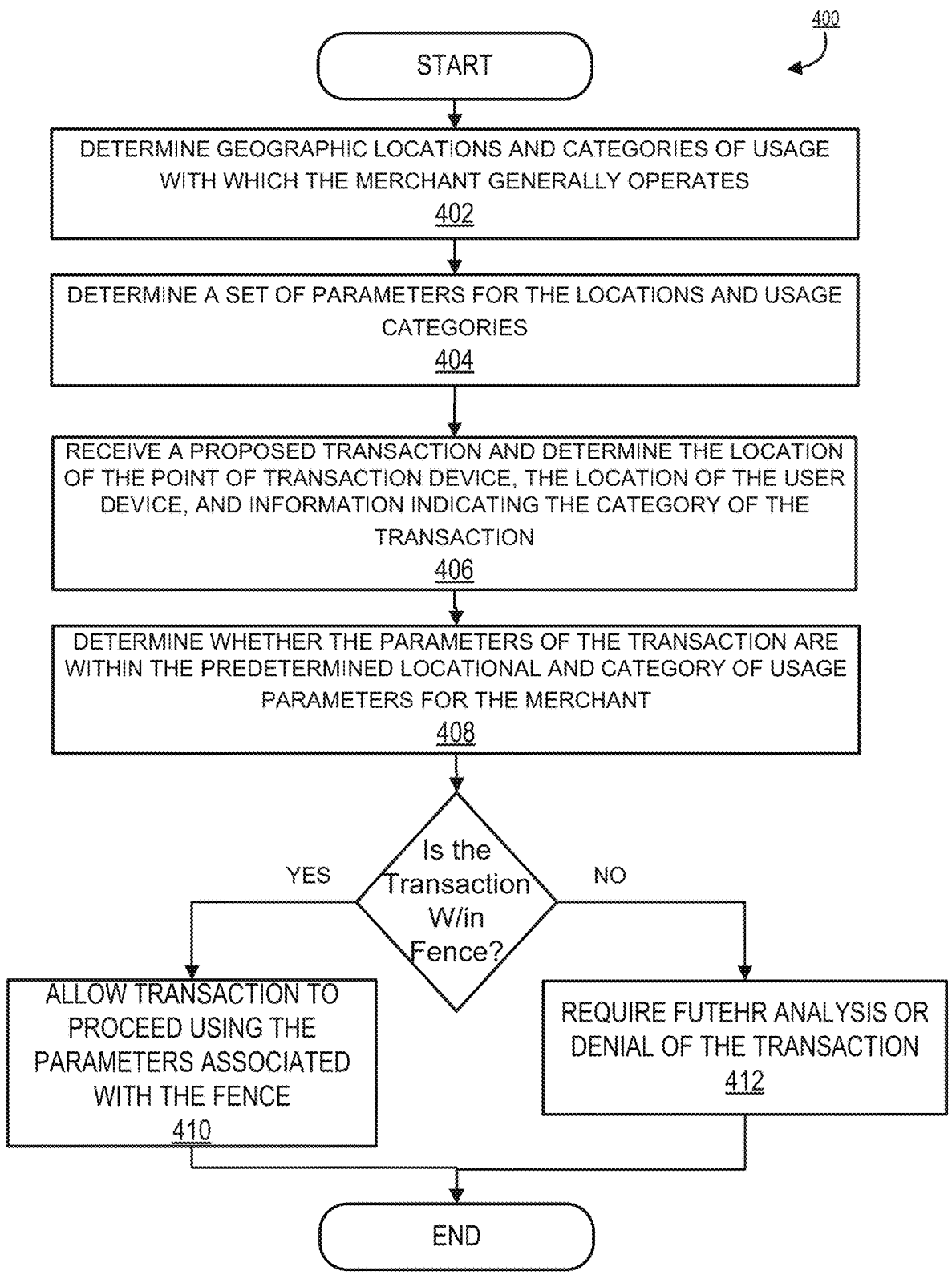

Having thus described embodiments of the invention in general terms, reference will now be made to the accompanying drawings, where:

FIG. 1 illustrates a network environment in which the invention operates, in accordance with one or more embodiments of the present invention;

FIG. 2 is a flowchart illustrating a process for determining geographic and category of usage parameters for a given resource interaction device, in accordance with one or more embodiments of the present invention;

FIG. 3 is a flowchart illustrating a process for applying the determined geographic and category of usage parameters to a given transaction, in accordance with one or more embodiments of the present invention; and FIG. 4 is a flowchart illustrating a process for applying a set of parameters to a requested transaction with a resource interaction system, in accordance with one or more embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

In various embodiments, the point-of-transaction device (POT) may be or include a merchant machine and/or server and/or may be or include the mobile device of the user may function as a point of transaction device. The embodiments described herein may refer to the use of a transaction, transaction event or point of transaction event to trigger the steps, functions, routines or the like described herein. In various embodiments, occurrence of a transaction triggers the sending of information such as alerts and the like. As used herein, a "bank account" refers to a credit account, a debit/deposit account, or the like. Although the phrase "bank account" includes the term "bank," the account need not be maintained by a bank and may, instead, be maintained by other financial institutions. For example, in the context of a financial institution, a transaction may refer to one or more of a sale of goods and/or services, an account balance inquiry, a rewards transfer, an account money transfer, opening a bank application on a user's computer or mobile device, a user accessing their e-wallet or any other interaction involving the user and/or the user's device that is detectable by the financial institution. As further examples, a transaction may occur when an entity associated with the user is alerted via the transaction of the user's location. A transaction may occur when a user accesses a building, uses a rewards card, and/or performs an account balance query. A transaction may occur as a user's mobile device establishes a wireless connection, such as a W-Fi connection, with a point-of-sale terminal. In some embodiments, a transaction may include one or more of the following: purchasing, renting, selling, and/or leasing goods and/or services (e.g., groceries, stamps, tickets, DVDs, vending machine items, or the like); withdrawing cash; making payments to creditors (e.g., paying monthly bills; paying federal, state, and/or local taxes and/or bills; or the like); sending remittances; transferring balances from one account to another account; loading money onto stored value cards (SVCs) and/or prepaid cards; donating to charities; and/or the like.

In some embodiments, the transaction may refer to a technology activity such as an event and/or action or group of actions facilitated or performed by a user's device, such as a user's mobile device. Such a device may be referred to herein as a "point-of-transaction device". A "point-of-transaction" could refer to any location, virtual location or otherwise proximate occurrence of a transaction. A "point-of-transaction device" may refer to any device used to perform a transaction, either from the user's perspective, the merchant's perspective or both. In some embodiments, the point-of-transaction device refers only to a user's device, in other embodiments it refers only to a merchant device, and in yet other embodiments, it refers to both a user device and a merchant device interacting to perform a transaction. For example, in one embodiment, the point-of-transaction device refers to the user's mobile device configured to communicate with a merchant's point of sale terminal, whereas in other embodiments, the point-of-transaction device refers to the merchant's point of sale terminal configured to communicate with a user's mobile device, and in yet other embodiments, the point-of-transaction device refers to both the user's mobile device and the merchant's point of sale terminal configured to communicate with each other to carry out a transaction.

In some embodiments, a point-of-transaction device is or includes an interactive computer terminal that is configured to initiate, perform, complete, and/or facilitate one or more transactions. A point-of-transaction device could be or include any device that a user may use to perform a transaction with an entity, such as, but not limited to, an ATM, a loyalty device such as a rewards card, loyalty card or other loyalty device, a magnetic-based payment device (e.g., a credit card, debit card, or the like), a personal identification number (PIN) payment device, a contactless payment device (e.g., a key fob), a radio frequency identification device (RFID) and the like, a computer, (e.g., a personal computer, tablet computer, desktop computer, server, laptop, or the like), a mobile device (e.g., a smartphone, cellular phone, personal digital assistant (PDA) device, MP3 device, personal GPS device, or the like), a merchant terminal, a self-service machine (e.g., vending machine, self-checkout machine, or the like), a public and/or business kiosk (e.g., an Internet kiosk, ticketing kiosk, bill pay kiosk, or the like), an entertainment device, and/or various combinations of the foregoing.

In some embodiments, a point-of-transaction device is operated in a public place (e.g., on a street corner, at the doorstep of a private residence, in an open market, at a public rest stop, or the like). In other embodiments, the point-of-transaction device is additionally or alternatively operated in a place of business (e.g., in a retail store, post office, banking center, grocery store, factory floor, or the like). In accordance with some embodiments, the point-of-transaction device is not owned by the user of the point-of-transaction device. Rather, in some embodiments, the point-of-transaction device is owned by a mobile business operator or a point-of-transaction operator (e.g., merchant, vendor, salesperson, or the like). In yet other embodiments, the point-of-transaction device is owned by the financial institution offering the point-of-transaction device providing functionality in accordance with embodiments of the invention described herein.

Further, the term "payment credential" or "payment vehicle," as used herein, may refer to any of, but is not limited to refers to any of, but is not limited to, a physical, electronic (e.g., digital), or virtual transaction vehicle that can be used to transfer money, make a payment (for a service or good), withdraw money, redeem or use loyalty points, use or redeem coupons, gain access to physical or virtual resources, and similar or related transactions. For example, in some embodiments, the payment vehicle is a bank card issued by a bank which a customer may use to perform purchase transactions. However, in other embodiments, the payment vehicle is a virtual debit card housed in a mobile device of the customer, which can be used to electronically interact with an ATM or the like to perform financial transactions. Thus, it will be understood that the payment vehicle can be embodied as an apparatus (e.g., a physical card, a mobile device, or the like), or as a virtual transaction mechanism (e.g., a digital transaction device, digital wallet, a virtual display of a transaction device, or the like). The payment vehicle may be an unrestricted resource. Unrestricted resources, as used herein may be any resource that is not restricted for transaction. In this way, the unrestricted resources may be applied to any transaction for purchase of a product or service.

In some embodiments, information associated with the purchase transaction is received from a POT including a point-of-sale (POS) terminal during a transaction involving a consumer and a merchant. For example, a consumer checking out at a retail merchant, such as a grocer, may provide to the grocer the one or more goods or products being purchased together with a payment method, loyalty card, and possibly personal information, such as the name of the consumer. This information along with information about the merchant may be aggregated or collected at the POS terminal and routed to the system or server of the present invention or otherwise a third party affiliate of an entity managing the system of this invention. In other embodiments when the purchase transaction occurs over the Internet, the information associated with the purchase transaction is collected at a server providing an interface for conducting the Internet transaction. In such an embodiment, the consumer enters product, payment, and possibly personal information, such as a shipping address, into the online interface, which is then collected by the server. The server may then aggregate the transaction information together with merchant information and route the transaction and merchant information to the system of the present invention. It will be further be understood that the information associated with the purchase transaction may be received from any channel such as an ATM, Internet, peer-to-peer network, POS, and/or the like.

As used herein, an offer may include or be referred to as a resource disbursement limiter, an item, a coupon, a discount, or an electronic coupon. In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, a non-monetary user account that includes only personal information associated with the user, or the like. The account is associated with and/or maintained by the entity. In other embodiments, an entity may not be a financial institution. In still other embodiments, the entity may be the merchant itself. In some embodiments, the "user" may be a customer (e.g., an account holder or a person who has a third party mobile wallet system associated with his/her mobile device).

Embodiments of the invention are directed to systems, methods, and computer program products for selective authorization of resource usage based on one or both geographic positioning and usage category information associated with a resource interaction system. For a given proposed interaction/transaction of the resource interaction system, the invention determines whether such interaction is in accordance with either an authorized geographic position of the resource interaction system or the remote requesting system and whether the category of transaction is authorized before allowing a transaction to occur.

FIG. 1 provides a system 100 for controlling communications and interaction with a resource interaction system 104, such as merchant server system for example, which is used to process payment transactions on a network or series of networks. FIG. 1 provides a unique system that includes specialized servers and system communicably linked across a distributive network of nodes required to perform the functions described herein.

The resource management system 102 generally comprises a communication device 104, a processing device 106, and a memory device 108. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 106 is operatively coupled to the communication device 104 and the memory device 108. The processing device 106 uses the communication device 104 to communicate with at least one network 116 and other devices on the network 116, such as, but not limited to a merchant server 118 (sometimes referred to herein as a resource interaction system), a point of transaction device 132, and/or a remote requesting system, such as a user device 146. As such, the communication device 104 generally comprises a modem, server, or other device for communicating with other devices on the network 116.

As further illustrated in FIG. 1, the resource management system 102 comprises computer-readable instructions 112 stored in the memory device 108, which in one embodiment includes the computer-readable instructions 112 of an application 114. In some embodiments, the memory device 108 includes data storage 110 for storing data related to the system environment 100, but not limited to data created and/or used by the application 114.

In one embodiment of the resource management system 102, the memory device 108 stores an application 114. In one embodiment of the invention, the application 114 may associate with applications having computer-executable program code. Furthermore, the resource management system 102, using the processing device 106 codes certain communication functions described herein. In one embodiment, the computer-executable program code of an application associated with the application 114 may also instruct the processing device 106 to perform certain logic, data processing, and data storing functions of the application. The processing device 106 is configured to use the communication device 104 to communicate with and ascertain data from one or more merchant server systems 118, point-of-transaction devices 132, and/or remote requesting system, such as a user device 146.

As illustrated in FIG. 1, the merchant server system 118 (sometimes referred to herein as a resource interaction system) is connected to the resource management system 102 via the network 116. The merchant server system includes the same types of components as the resource management system 102, namely a communication device 120, processing device 122, memory device 124, data storage 126, computer readable instructions 128, and an application 130.

The merchant server system is further equipped to communicate with various point of transaction devices 132, such as point of sale terminals at a merchant location or in a merchant's mobile vehicle or mobile location. The point of transaction devices may take various forms, but typically include the same types of components as the resource management system 102 and the merchant server system 118, namely a communication device 134, processing device 136, memory device 138, data storage 140, computer readable instructions 142, and an application 144.

Further, the merchant server system is further equipped to communicate with various user devices 146, such as mobile phones, tablets, personal computers, wearables, and the like. Again, user devices may take various forms, but typically include the same types of components as the resource management system 102 and the merchant server system 118, namely a communication device 148, processing device 150, memory device 152, data storage 154, computer readable instructions 156, and an application 158.

As discussed previously, a merchant or other service provider is typically associated with one or more specific geographic locations in which they operate. They are also generally associated with one or more categories of transactions for goods and services. Further, such merchants may have customers that are located in certain geographic areas. These parameters essentially define what would be considered normal or customary transactions by the merchant. Such normal or customary transactions, in general, require less restrictive transaction security measures, as they fall within a general pattern of operation with generally recognizable customers. Identifying these parameters, in general, should decrease transaction latency and reduce the number of instances where transactions are delayed or denied.

With reference to FIG. 1, generally when a merchant in onboarded to the network, the merchant will complete various surveys and provide access to various information that define the type of business the merchant operates and the categories of goods and services the merchant provides. The information may also indicate the geographic location or locations where the merchant operates and whether or not the merchant uses mobile point of transaction devices and/or has an online presence for sales. In addition to this directly provided information, the merchant will have and will continue to have historical transaction data with various customers, which include various information of interest, such as the types of goods and services provided, location of point of transaction devices for each transaction, and location of a customer for each transaction. This collective data provides necessary information to create a geographic, as well as a usage category fence around the merchant's transactions, where transactions having characteristics that are "within the fence" having less restrictions and scrutiny than for transactions considered to be "outside the fence" based on either a geographic location of the transaction and/or a category of the transaction.

With reference to FIG. 2, in an initial onboarding process 200 of the merchant and as periodically updated going forward, the resource management system 102 retrieves stored information input via the merchant server system (resource interaction system 118) regarding the merchant's geographic location(s) in which it typically operates and the category or categories of goods and services that the merchant provides. (See 202). The resource management system 102 further retrieves historical transaction data representing transactions the merchant has had with customers in the past, in terms of location of the merchant, location of the user, and the category of services and/or goods provided associated with each transaction. (See 204) The resource management system 102 may normalize the data removing any outliers or anomalies that deviate from the remaining data. (See 205). In some embodiments, the resource management system 102 may weight certain data more than others based on determined weighting parameters associated with the type of data. (See 206). In some embodiments, the system may apply various artificial intelligence and/or other algorithms to the data. Based on the data, the resource management system 102 determines a base positional location or locations and category or categories of usage for the resource interaction system 118. (See 208).

In some embodiments, resource management system 102 may provide more in-depth analysis to determine the positional location and category of usage data. For example, the system may analyze other merchant systems that have similar locational and/or usage data to not only determine base positional location or locations and category or categories of usage for the resource interaction system 118 based on its own data, but also data of similar situated merchants, so as to provide a more predictive output.

In some embodiments, the process 200 described in FIG. 2 is a continuous or semi-continuous process by which the resource management system 102 refines, evolves, and/or alters the base positional location or locations and category or categories of usage for the resource interaction system based on its own transaction data and transaction data of other similarly situated resource interaction systems.

As an example, resource management system 102 may analyze data provided by a particular merchant, historical transaction data for the merchant and data for similarly situated merchants. Based on this data, the resource management system 102 may determine the one or more geographic locations that the merchant performs transactions. These locations may be physical stores/locations of the merchant, various mobile locations, online sales, etc. The resource management system 102 will also determine the categories of goods and services usually sold or provided by the merchant.

The system may also identify the geographic locations of customers that the merchant usually transacts with. For example, the merchant may be located in the Mid-Western United States, but its goods are related to mountain climbing, and most of its transactions are with locations in the U.S. with mountainous terrain. In this instance, the resource management system 102 may identify the locations of these customers as part of the customary base locations for transactions.

Based on these various data, the resource management system 102 creates a geographic and category of usage "fence" around the merchant. Transactions that fall within the parameters of the geographic and category of usage "fence" are generally considered less susceptible to malfeasants, while transactions that are outside the fence may be subjected to more analysis, may require alerts and notifications, or may be denied altogether. In this manner, the merchant creates locational and category of usage border where transactions within the boarder are allowed to process with less required scrutiny, while transactions outside the fence may require further review.

The resource management system 102 may be visualized as creating hot spots within a geographic map, where transactions within certain usage categories are allowed, while transactions either in other locations and/or for other categories are designated for further evaluation.

FIG. 3 illustrates a process 300 for using the determined base locations and categories of usage data. In this embodiment, the resource management system 102 receives information regarding a proposed transaction between user device 146 and a resource interaction system 118, which in this case, is a merchant transaction system, such as a point of transaction device or remote transaction server. (See 302). The resource management system 102 determines the location of the point of transaction device, the location of the user device, and information indicating the category of the transaction. (See 304). Based on this information, the resource management system 102 determines whether the parameters of the transaction are within the predetermined locational and category of usage parameters for the merchant. (See 306). In other words, does the transaction fall within or outside the fence. If the transaction is within the parameters, the transaction is allowed to proceed between the user device and point of transaction device. (See 308). However, if the proposed transaction is outside the accepted fence or parameters, the transaction may be subjected to further scrutiny, generate an alert, or denied. (See 310).

As will be understood, the system of the claimed invention provides various tools and features for merchant/customer and other transactions. The system envisions on boarding all types of merchants spanning a large area of products and services (retail, restaurant, petroleum, financial, etc.). The system can identify when merchants are onboarded and when merchants change categories of products and/or services they provide based either on data input by the merchant and/or by monitoring their transaction data.

The system uses a combination of information about the merchant (from merchant enrollment in merchant services) and geographic data, such as time zone data, to generate and provide a smart transaction detection package for the merchant that is defined in terms of geographic locations of services provided, as well as categories of usage of products and services sold by the merchant. In this way the system can quickly determine if a particular transaction requires added scrutiny based on the categories of goods and services the merchant typically provides within the given geographic location, such as within a given time zone.

For example, the system may identify a merchant that sets up merchant services for card present processing in Location A (e.g., the merchant has a brick and mortar location at physical Location A). The system may identify that the time zone of the transaction matches the time zone of the merchant based on the merchant setting up merchant services. However, if the time zones do not match for the transaction, then the proposed transaction may be problematic and require further scrutiny.

The system may recognize complex transaction patterns of the merchant and its customers. For example, a merchant may sell certain goods and services either in a particular geographic location or to customers in a specific geographic location. In this instance, if a transaction with a customer of the merchant is for a good or service category that is outside this bounded of fenced transactions, then, even though it is a known customer of the merchant, because of the change in the good or service, the transaction may be identified for more scrutiny. For example, if the merchant has a history of selling mountain gear to a particular customer, but the current transaction is for a boat, the system may flag the transaction for further scrutiny, as it is a different category of goods than what the merchant has previously sold to the customer. If it is determined that the transaction is not an issue, this transaction could be marked as of interest in determining whether it and future similar transactions indicate that the merchant is altering its goods and services that it offers to a particular customer base or to a particular geographic area.

The system is even equipped to handle more complex transaction, such as when a customer orders ahead online from the merchant, the merchant is mobile, the merchant has multiple locations, or the like. For example, the system could be predictive as to the merchant's intentions. As the merchant becomes mobile and crosses time zones, the system builds these modifications into its determined geographic base location data and its category of usage to better handle transactions while triggering or alerting to nonconforming or problematic transactions. As such, the system may predict where the transactions may occur based on gathering information about the merchant point of transaction devices, merchant purchases, merchant personal devices, physical locations, or other indicators that the merchant is mobile (social media post (merchant going to a tradeshow), buying airline tickets, gas purchases, etc.). This type of information is all processed by the system to determine and evolve the merchants geographic and category of usage fence to asses where a given transaction requires less or more scrutiny.

It is important to understand that the restrictions (i.e., fence) that is constructed around a merchant can be changed or modified based on constant assessment of new transactions and behaviors of the merchant. Further, it must be understood that there could be several different "fences" for a given merchant. For example, there may be a specific fence between a merchant and a specific customer, where the fence is based on previous geographic locations of transactions with the user and for certain categories of goods or services.

For example, a specific fence may allow a specific customer to purchase boots when the user is a specific geographic location that is within the "fence." However, if that same customer traveled to a different geographic location and attempted to purchase the same boots, such transaction may be flagged for further review, as it is a transaction outside of the "fence" with that particular customer.

Other examples of this customization will come to the mind of one skilled in the art. For example, a merchant may traditionally sell a category of good in a first geographic location such that the sale of such good in the geographic location is expected and within a "fence" that requires less scrutiny of the transaction. But, if the merchant were to sell the same good to a customer in another geographic location, such transaction may be flagged for scrutiny.

To reinforce the dynamic nature of the system, the system could monitor the activities of a merchant to determine if the merchant is traveling. The system could then alter the geofences it has determined to account for this travel, so that certain transactions the merchant enters into while traveling fall within the modified fence and require less scrutiny.

In addition to monitoring and applying proper security regarding transactions, the system of the claimed invention may also be used to regulate parameters associated with a transaction based on locational and jurisdiction information. Specifically, as is known, different states, counties, and municipalities have different tax laws, tax rates, regulatory requirements, and the like associated with the sale of goods and services. Further certain types of products or services may be prohibited and/or highly regulated in certain areas, such as for example, the sale of spray paint in a metropolitan area may be heavily regulated in terms of who is allowed to purchase such items.

While it is understood that proper collection of taxes is a challenge, compliance with other restrictions and regulations is still a concern without good solution. Further, many address it from the point of the view of the consumer and not from the merchant. But, as merchants become more mobile, understanding these issues from the perspective of the merchant's location at time of the sale also should be addressed. In other words, for some merchants, each individual transaction may require different treatment based on factors, such as, merchant location at time of sale, customer location at time of sale, and the category of good or service provided.

As one example, the system may use information input by the merchant, historical transaction data and other transactions, media posts, etc. by the merchant to define geographic location information and usage categories associated with the merchant. Based on this data, the system may develop customized rules for the merchant that account for tax, regulatory, and other rules that may apply to the merchant's activities. The customized rules may be on a merchant location basis, a customer location basis, and/or a type of good or service provided by the merchant basis. These various rules are then applied in a customized manner to each transaction to account for taxes, regulatory, and other restrictions. In one form, it may be application of proper taxes and accounting, while in other cases, it may be added scrutiny or outright denial of a transaction, if such transaction would violate local regulations and rules.

Using this analysis and customized rules, as a merchant becomes mobile and crosses into various other counties or states or other jurisdictions, the system may identify the local or state tax implications associated with the move. This may be from the merchant end or the customer end in the form of variable sales tax, payroll tax, or the like. As such, the system may predict where the transactions may occur based on gathering information about the merchant point of transaction device or other indicators that the merchant is mobile (social media post (merchant going to a tradeshow), buying airline tickets, gas purchases, etc.). The system may recognize that the merchant may be selling products at a new location and allow for the transactions to process, but identifies and adjusts the cost to the customer based on the tax implications in that location. Furthermore, the system generates correct accounting on the back end for the merchant across the various locations the merchant may be located. In instances where the service or goods are regulated in a given location, the system may alert the merchant as to the restrictions and/or deny the transaction, if required.

With reference to FIG. 4, in one embodiment of a process 400, the resource management system 102 determines various information about the resource interface system, which, in this case, is a merchant system. The resource management system 102 retrieves entered information by the merchant and historical transaction data to determine the geographic locations in which the merchant generally operates and the categories of usage, such as the types of goods and services that the merchant sales. (See 402). Based on this, the resource management system 102 determines a set of parameters for the locations and usage categories, which are governed by a set of rules. (See 404). These set of parameters effectively create another type of "fence" around transactions. This fence creation allows for transactions falling within the fence to be streamlined and processed faster. For example, a transaction following within the fence has preset processing and accounting rules in place, as such that transaction can be processed with increased speed and efficiency.

Following set up of the parameters, the resource management system 102 is then positioned to analyze transactions as they are received and handle appropriately. For example, the system may receive a proposed transaction between the merchant and a customer. (See 406). They system may determine whether the transaction falls inside the parameters of the fence. (See 408). If so, the various tax and regulatory treatments associated with the defined fence are applied to the transaction, and the transaction is processed so as to apply proper taxes to the transaction, supply the customer with various regulatory guidelines and other information that may be associated with such a transaction. (See 410). If the transaction does not fall within the "fence," then it is subjected to further scrutiny. (See 412). Further scrutiny may involve processing the transaction based on a different set of rules and applying different tax and regulatory schema or it may mean denying the transaction as violating some rule or regulation. As can be seen, the generation of the "fence" allows transactions following within the fence to process quicker and more efficiently, as they are not held up for further scrutiny and treatment.

Referring back to 406, the system may also review transaction data relating to locations of customers to determine the geographic location and usage categories for the merchant to transact with such customers, to thereby create "fences" for interactions with certain customers or groups of customers. As an example, a merchant may be located on the East Coast of the U.S., but sell mountain climbing equipment to customers in Colorado. In this instance, the resource management system 102 will analyze these transactions and create a specialized transaction "fence" for these transactions. Parameters are provided for handling tax calculations, accounting, determining rules and regulations associated with these types of sales. As such, with reference to 410, when a transaction from a customer meets the criteria within the "fence," the transaction is processed using the parameters associated with the fence in a streamlined way so as to handle tax, accounting, and alert functions associated with the sale.

Regarding 402 above, it is understood that the determination of merchant location and usage categories can be dynamic. Specifically, the system may perform such operations periodically, semi-continuously, or continuously to determine updated geographic location(s) and categories of usage data. For example, data input by the merchant, social feeds from the merchant, and recent transaction history may indicate that the merchant is, for example, opening or has opened a new location, or that the merchant has initiated a new mobile sales plan, or the merchant is currently or will be traveling and that transactions may occur at new locations. The data could also indicate that the merchant is either planning to or is offering new types of good or services. Transaction data may indicate that the merchant has entered into or is now receiving transaction requests from new geographic locations. All of these different forms of evolution may be captured and processed by the resource management system to create new customized transaction fences that meet the needs of the merchant.

As an example, the merchant may either be planning to or actually beginning travel, such as to go to a pop up location or to a trade show, etc. where the merchant is planning to make sales. The information may include the categories of products or services that the merchant plans to sell at such locations. Based on this analysis, the resource management system may determine a set of parameters to be used for transactions occurring at the new locations. This may include tax rules, regulatory rules, any required customer notices, etc. that would be associated with such transactions. As such, when the merchant performs transactions at the locations, the fence that was built for the location is used. Transactions falling within the fence in terms of meeting the geographic location parameters and the categories of usage are processed using the parameters associated with the fence, while transactions that fall outside the fence are subjected to further scrutiny. In this way, transactions at the new location can be processed in a streamlined manner. This has particular value where the location is remote, such as at a tradeshow, food truck parking lot, etc. where delays in processing transactions may be problematic, such as where data transmission coverage may be spotty or where the merchant may be doing a high volume of transactions in a short period of time.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a non-transitory, computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with selective authorization of resource usage based on geographic positioning and usage category information associated with a resource interaction system.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for selective authorization of resource usage based on geographic positioning and usage category information associated with a resource interaction system, said system comprising:
   a plurality of mobile merchants, each of the mobile merchants conducting business from a plurality of locations, each of the plurality of locations being used exclusively by the each corresponding mobile merchant at one of a plurality of different times;
   a plurality of customers, each customer participating in at least one transaction of a plurality of transactions with at least one of the plurality of mobile merchants;
   a plurality of transaction categories, each category describing a type of good or service;
   a plurality of authorization fences, each fence uniquely associated with a one of the plurality of transactions and each fence including data and rules, wherein the rules operate on the data and on the one transaction to determine if the one transaction is inside or outside of the each fence;
   the plurality of transactions, each transaction including:
      a current category selected from one of the plurality of transaction categories,
      a current merchant selected from one of the plurality of mobile merchants,
      a current customer selected from one of the plurality of customers,
      a current time,
      a merchant location locating the one of the plurality of mobile merchants,
      a customer location locating the one of the plurality of customers,
      and being selectively authorized by a computing platform according to a plurality of authorization fences uniquely specific to the each transaction, the plurality of authorization fences including:
         a first fence including authorized locations of the current merchant,
         a second fence including authorized locations of the current customer,
         a third fence including the current category and the current merchant,
         a fourth fence including the current category and the current customer,
         a fifth fence including the current category and the customer location,
         a sixth fence including the current category and the merchant location,
         a seventh fence including the current customer and a historical record of locations associated with previous transactions of the plurality of transactions specific to the current customer,
         an eighth fence including the current merchant and a historical record of locations associated with previous transactions of the plurality of transactions specific to the current merchant, and
         a ninth fence comprising a plurality of other fences selected from other transactions of the plurality of transactions selected from those associated with other merchants of the plurality of mobile merchants wherein the selection is based on similarities between the current category and the respective current category of the respective other transaction and based on similarities between the current merchant location and the respective merchant location of the respective other transaction;
   the computing platform comprising
      a memory device storing a plurality of computer instructions, and
      at least one electronic processor in communication with the memory,
      wherein the at least one electronic processor is configured to execute the computer instructions to:
         for each of the plurality of transactions;
            selectively authorized the each transaction by evaluating each of the respective plurality of authorization fences by evaluating the corresponding rules and data to determine if the each transaction is inside or outside of the each of the respective plurality of authorization fences including steps to:
               receive, via an electronic network, historic positional information and category of usage information related to at least one resource interaction system,
               where said historic positional and category of usage information defines a base positional location and category of usage for the at least one resource interaction system;
               receive, via an electronic network, current positional information associated with the at least one resource interaction system;
               access, via an electronic network, authorized usage parameters associated with the current positional information associated with the at least one resource interaction system; and
               control usage of the resource interaction system based on authorized usage parameters associated with the current positional information and based on the category of usage information;
            wherein when the each transaction is determined to be inside all of the respective plurality of authorization fences, the selective reduces the processing time of the each transaction by incorporating preset processing and accounting rules to handle tax, accounting, and authentication functions, and
            wherein when the each transaction is determined not to be inside all of the respective plurality of authorization fences, the processing of the each transaction is flagged for further review, the further review requiring additional processing time as compared to the reduced processing time.

2. A system according to claim 1, wherein said historic positional information relates to one or more geographic locations where at least one of stored data and/or historic interaction data indicate the one or more geographic locations.

3. A system according to claim 1, wherein said historic positional information relates to one or more geographic locations, wherein said at least one electronic processor is configured to execute the computer instructions to determine the one or more geographic locations based on at least one of stored data and/or historic interaction data indicating the historic positional information.

4. A system according to claim 1, wherein said category of usage information is based on one or more of stored data and/or historic interaction data.

5. A system according to claim 1, wherein said at least one electronic processor is configured to execute the computer instructions to determine said category of usage information based on one or more of stored data and/or historic interaction data.

6. A system according to claim 1, wherein said category of usage data defines types of interactions that are allowed to occur using the resource interaction system, wherein said at least one electronic processor is configured to execute the computer instructions to control usage of the resource interaction system based on determining whether a current proposed interaction has a corresponding interaction category that matches category of usage information associated with the resource interaction system.

7. A system according to claim 6, wherein said at least one electronic processor is configured to execute the computer instructions to at least one of deny and/or send an alert if the current proposed interaction has a corresponding interaction category that does not match category of usage information associated with the resource interaction system.

8. A system according to claim 1, wherein said historic positional information relates to one or more geographic locations where the resource interaction system has been designated for authorized use, wherein said at least one electronic processor is configured to execute the computer instructions to control usage of the resource interaction system based on determining whether a current proposed interaction is at a geographic location corresponding to the one or more geographic locations associated with the historic positional information.

9. A system according to claim 8, wherein said at least one electronic processor is configured to execute the computer instructions to at least one of deny and/or send an alert if the current proposed interaction is at a geographic location that does not correspond to the one or more geographic locations associated with the historic positional information.

10. A system according to claim 1, wherein the category of usage information is provided in a data storage location and referenced based on the resource interaction system.

11. A system according to claim 1, wherein the category of usage information is determined based on analysis of previous interactions associated with the resource interaction system.

12. A system according to claim 1, wherein the historical position information is based on analysis of previous interactions associated with the resource interaction system, where such interactions indicate geographic locations where the resource interaction system has been used in the past.

13. A system according to claim 1, wherein the historical position information is based on analysis of previous interactions associated with the resource interaction system, where such interactions indicate geographic locations from which the resource interaction system has received requests for interactions.

14. A system according to claim 1, wherein said at least one electronic processor is configured to execute the computer instructions to:
receive a request from a requesting system to perform an interaction with the resource interaction system;
determine a geographic location associated with the requesting system;
compare the geographic location associated with the requesting system with the historical position information associated with the resource interaction system; and
control usage of the resource interaction system with the requesting system based on authorized usage parameters associated with the geographic location associated with the requesting system and the current positional information of the resource interaction system.

15. A system according to claim 14, wherein the authorized usage parameters define geographic locations where the resource interaction system can receive and fulfill requests from, and wherein said at least one electronic processor is configured to execute the computer instructions to control usage of the resource interaction system, such that if the geographic location associated with the requesting system is not a geographic location allowed in the authorized usage parameters, an interaction between the requesting system and the resource interaction system is denied.

16. A system according to claim 14, wherein the authorized usage parameters define geographic locations where the resource interaction system can be located in order to receive and fulfill requests, and wherein said at least one electronic processor is configured to execute the computer instructions to control usage of the resource interaction system, such that if the current geographic location associated with the resource interaction system is not a geographic location allowed in the authorized usage parameters, an interaction between the requesting system and the resource interaction system is denied.

17. A system according to claim 1, wherein said at least one electronic processor is configured to execute the computer instructions to update the authorized usage parameters based on a set of recent interactions with the resource interaction system.

18. A system according to claim 1, where the geographic information is based on a time zone associated with the transaction.

19. A computer implemented method for selective authorization of source usage based on geographic positioning and usage category information associated with a resource interaction system, the resource interaction system comprising:
a plurality of mobile merchants, each of the mobile merchants conducting business from a plurality of locations, each of the plurality of locations being used exclusively by the each corresponding mobile merchant at one of a plurality of different times;
a plurality of customers, each customer participating in at least one transaction of a plurality of transactions with at least one of the plurality of mobile merchants;
a plurality of transaction categories, each category describing a type of good or service;
a plurality of authorization fences, each fence uniquely associated with a one of the plurality of transactions and each fence including data and rules, wherein the rules operate on the data and on the one transaction to determine if the one transaction is inside or outside of the each fence;

the plurality of transactions, each transaction including:
- a current category selected from one of the plurality of transaction categories,
- a current merchant selected from one of the plurality of mobile merchants,
- a current customer selected from one of the plurality of customers,
- a current time,
- a merchant location locating the one of the plurality of mobile merchants,
- a customer location locating the one of the plurality of customers, and being selectively authorized by a computing platform according to a plurality of authorization fences uniquely specific to the each transaction, the plurality of authorization fences including:
- a first fence including authorized locations of the current merchant,
- a second fence including authorized locations of the current customer,
- a third fence including the current category and the current merchant,
- a fourth fence including the current category and the current customer,
- a fifth fence including the current category and the customer location,
- a sixth fence including the current category and the merchant location,
- a seventh fence including the current customer and a historical record of locations associated with previous transactions of the plurality of transactions specific to the current customer,
- an eighth fence including the current merchant and a historical record of locations associated with previous transactions of the plurality of transactions specific to the current merchant, and
- a ninth fence comprising a plurality of other fences selected from other transactions of the plurality of transactions selected from those associated with other merchants of the plurality of mobile merchants wherein the selection is based on similarities between the current category and the respective current category of the respective other transaction and based on similarities between the current merchant location and the respective merchant location of the respective other transaction;

the computing platform comprising
- a memory device storing a plurality of computer instructions, and
- at least one electronic processor in communication with the memory,
- wherein the at least one electronic processor is configured to execute the computer instructions to implement the method comprising:

for each of the plurality of transactions;
- selectively authorized the each transaction by evaluating each of the respective plurality of authorization fences by evaluating the corresponding rules and data to determine if the each transaction is inside or outside of the each of the respective plurality of authorization fences including steps to:

receive, via an electronic network, historic positional information and category of usage information related to at least one resource interaction system, where said historic positional and category of usage information defines a base positional location and category of usage for the at least one resource interaction system;

receive, via an electronic network, current positional information associated with the at least one resource interaction system;

access, via an electronic network, authorized usage parameters associated with the current positional information associated with the at least one resource interaction system; and control usage of the resource interaction system based on authorized usage parameters associated with the current positional information and based on the category of usage information;

wherein when the each transaction is determined to be inside all of the respective plurality of authorization fences, the selective reduces the processing time of the each transaction by incorporating preset processing and accounting rules to handle tax, accounting, and authentication functions, and wherein when the each transaction is determined not to be inside all of the respective plurality of authorization fences, the processing of the each transaction is flagged for further review, the further review requiring additional processing time as compared to the reduced processing time.

20. A computer program product comprising computer program code stored on a non-transitory computer-readable medium, said computer program product used for selective authorization of resource usage based on geographic positioning and usage category information associated with a resource interaction system, the computer program product comprised by the resource interaction system, the resource interaction system comprising:

a plurality of mobile merchants, each of the mobile merchants conducting business from a plurality of locations, each of the plurality of locations being used exclusively by the each corresponding mobile merchant at one of a plurality of different times;

a plurality of customers, each customer participating in at least one transaction of a plurality of transactions with at least one of the plurality of mobile merchants;

a plurality of transaction categories, each category describing a type of good or service;

a plurality of authorization fences, each fence uniquely associated with a one of the plurality of transactions and each fence including data and rules, wherein the rules operate on the data and on the one transaction to determine if the one transaction is inside or outside of the each fence;

the plurality of transactions, each transaction including:
- a current category selected from one of the plurality of transaction categories,
- a current merchant selected from one of the plurality of mobile merchants,
- a current customer selected from one of the plurality of customers,
- a current time,
- a merchant location locating the one of the plurality of mobile merchants,
- a customer location locating the one of the plurality of customers, and being selectively authorized by a computing platform according to a plurality of authorization fences uniquely specific to the each transaction, the plurality of authorization fences including:
- a first fence including authorized locations of the current merchant,
- a second fence including authorized locations of the current customer,
- a third fence including the current category and the current merchant,
- a fourth fence including the current category and the current customer,
- a fifth fence including the current category and the customer location,
- a sixth fence including the current category, and the merchant location,
- a seventh fence including the current customer and a historical record of locations associated with previous transactions of the plurality of transactions specific to the current customer,
- an eighth fence including the current merchant and a historical record of locations associated with previous transactions of the plurality of transactions specific to the current merchant, and
- a ninth fence comprising a plurality of other fences selected from other transactions of the plurality of transactions selected from those associated with other merchants of the plurality of mobile merchants wherein the selection is based on similarities between the current category and the respective current category of the respective other transaction and based on similarities between the current merchant location and the respective merchant location of the respective other transaction;

said computer program code comprising computer instructions to cause one more control units to perform the following operations:
  for each of the plurality of transactions;
    selectively authorized the each transaction by evaluating each of the respective plurality of authorization fences by evaluating the corresponding rules and data to determine if the each transact ion is inside or outside of the each of the respective plurality of authorization fences including steps to:
      receive, via an electronic network, historic positional information and category of usage information related to at least one resource interaction system,
      where said historic positional and category of usage information defines abase positional location and category of usage for the at least one resource interaction system;
      receive, via an electronic network, current positional information associated with the at least one resource interaction system;
      access, via an electronic network, authorized usage parameters associated with the current positional information associated with the at least one resource interaction system; and
      control usage of the resource interaction system based on authorized usage parameters associated with the current positional information and based on the category of usage information;
    wherein when the each transaction is determined to be inside all of the respective plurality of authorization fences, the selective reduces the processing time of the each transaction by incorporating preset processing and accounting rules to handle tax, accounting, and authentication functions, and
    wherein when the each transaction is determined not to be inside all of the respective plurality of authorization fences, the processing of the each transaction is flagged for further review, the further review requiring additional processing time as compared to the reduced processing time.

* * * * *